United States Patent
Lehtiniemi et al.

(10) Patent No.: US 11,451,743 B2
(45) Date of Patent: Sep. 20, 2022

(54) CONTROL OF IMAGE OUTPUT

(71) Applicant: Nokia Technologies Oy, Espoo (FI)

(72) Inventors: Arto Juhani Lehtiniemi, Lempäälä (FI); Jussi Artturi Leppänen, Tampere (FI); Lasse Juhani Laaksonen, Tampere (FI); Miikka Tapani Vilermo, Siuro (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/130,727

(22) Filed: Dec. 22, 2020

(65) Prior Publication Data
US 2022/0201247 A1  Jun. 23, 2022

(51) Int. Cl.
*H04N 7/15* (2006.01)
*G06T 3/60* (2006.01)

(52) U.S. Cl.
CPC ............... *H04N 7/15* (2013.01); *G06T 3/60* (2013.01); *G06T 2200/24* (2013.01)

(58) Field of Classification Search
CPC .................................... H04N 7/15; G06T 3/60
USPC ............................................ 348/14.01–14.16
See application file for complete search history.

(56) References Cited

U.S. PATENT DOCUMENTS

| | | | | |
|---|---|---|---|---|
| 11,158,028 | B1* | 10/2021 | Melamed | G06F 3/04845 |
| 2006/0036950 | A1* | 2/2006 | Himberger | G06F 3/0481 |
| | | | | 715/732 |
| 2019/0312985 | A1* | 10/2019 | Yeap | G06T 7/74 |
| 2020/0053283 | A1* | 2/2020 | Li | H04N 5/23293 |

FOREIGN PATENT DOCUMENTS

WO   WO-2017050169 A1 *  3/2017  ........... G06F 3/0482

OTHER PUBLICATIONS

"New features available with iOS 14", Apple, Retrieved on Feb. 9, 2021, Webpage available at : https://www.apple.com/uk/ios/ios-14/features/.

* cited by examiner

*Primary Examiner* — Melur Ramakrishnaiah
(74) *Attorney, Agent, or Firm* — Alston & Bird LLP

(57) ABSTRACT

An apparatus, method and computer program is described comprising: providing a gallery or user interface comprising a plurality of images; identifying either a mirrored or non-mirrored state associated with at least one of the images; determining, based on at least one criterion, that at least part of the at least one image is to be modified from its associated mirrored or non-mirrored state to the opposite state; and based on the determination, performing the modification.

20 Claims, 9 Drawing Sheets

CONTROL OF IMAGE OUTPUT

FIELD

Example embodiments relate to apparatuses, methods and computer programs for controlling image output.

BACKGROUND

Electronic devices, such as mobile phones, tablets, or the like, may have front facing and rear facing cameras. When using a front-facing camera for taking pictures (e.g. so-called "selfies"), the viewfinder on the screen of the device may show the image to be mirrored, while the image may then be saved as a mirrored or non-mirrored image. There remains room for further developments in this field.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

In a first aspect, this specification provides an apparatus comprising at least one processor; and at least one memory including computer program code; the at least one memory and the computer program code configured to, with the at least one processor, cause the apparatus at least to perform: providing a gallery or user interface comprising a plurality of images; identifying either a mirrored or non-mirrored state associated with at least one of the images; determining, based on at least one criterion, whether at least part of the at least one image is to be modified from its associated mirrored or non-mirrored state to the other state; and based on the determination, performing the modification.

In some example embodiments, performing the modification comprises performing a horizontal flipping of at least part of the at least one image.

In some example embodiments, the at least one criterion is based on a predetermined user setting associated with the gallery or user interface.

In some example embodiments, the provided gallery is associated with a gallery application of the apparatus and is configured to provide a plurality of images associated with a first user or a first user account.

In some example embodiments, the apparatus is configured to receive, via the gallery application of the apparatus, selection of a first image, and wherein the at least one criterion is based on the mirrored or non-mirrored state associated with the selected first image.

In some example embodiments, performing the modification comprises modifying at least part of at least one other image of the gallery application which has or have the other state to that of the selected first image.

In some example embodiments, the provided gallery comprises at least one image representing, in a first part of said image, the first user and in a second part of said image, a second user, wherein the at least one criterion is based on a predetermined first user setting associated with the first user and a predetermined second user setting associated with the second user.

In some example embodiments, based on determining that the predetermined first user setting is different from the predetermined second user setting, performing the modification comprises performing the modification for only part of said image.

In some example embodiments, based on determining that the predetermined first user setting is associated with modifying the first part of said image and the predetermined second user setting is associated with not modifying the second part of said image, performing the modification comprises performing the modification without modifying the second part of said image.

In some example embodiments, based on determining that the first and the second parts of said image comprise a same or similar type of object, performing the modification further comprises performing a rotation of the second part of said image so as to substantially align said second part with the modified first part of said image.

In some example embodiments, the type of object is a user's head.

In some example embodiments, the provided user interface is associated with a multi-user video call application in which the plurality of images correspond to respective images or video feeds for a plurality of users, wherein the user interface comprises a first image corresponding to a first user associated with the apparatus and at least one second image corresponding to at least one second user.

In some example embodiments, the at least one criterion is based on identifying a mirrored or non-mirrored state associated with the at least one second image which is opposite to that associated with the first image, and wherein performing the modification comprises modifying the mirrored or non-mirrored state of the first image to the opposite state.

In some example embodiments, the at least one criterion is based on identifying a mirrored or non-mirrored state associated with a predetermined number of second images which is opposite to that associated with the first image, and wherein performing the modification comprises modifying the mirrored or non-mirrored state of the first image to the opposite state.

In some example embodiments, the apparatus is further configured to identify a predefined element in at least one image to be modified from its associated mirrored or non-mirrored state to the opposite state, and based on identifying said predefined element, to determine not to modify at least part of the at least one image which comprises said predefined element.

In some example embodiments, the predefined element comprises a text element in a non-reversed format.

In some example embodiments, the mirrored or non-mirrored state of the at least one image is determined based on metadata associated with the respective image(s).

In some example embodiments, the metadata is indicative of whether the at least one image was captured with a front-facing or rear-facing camera of the apparatus.

In a second aspect, this specification describes a method, comprising: providing (e.g. at an apparatus) a gallery or user interface comprising a plurality of images; identifying either a mirrored or non-mirrored state associated with at least one of the images; determining, based on at least one criterion, that at least part of the at least one image is to be modified from its associated mirrored or non-mirrored state to the opposite state; and based on the determination, performing the modification.

In some example embodiments, performing the modification comprises performing a horizontal flipping of at least part of the at least one image.

In some example embodiments, the at least one criterion is based on a predetermined user setting associated with the gallery or user interface.

In some example embodiments, the provided gallery is associated with a gallery application of an apparatus and is configured to provide a plurality of images associated with a first user or a first user account.

In some example embodiments, to the method further comprises receiving, via the gallery application of the apparatus, selection of a first image, and wherein the at least one criterion is based on the mirrored or non-mirrored state associated with the selected first image.

In some example embodiments, performing the modification comprises modifying at least part of at least one other image of the gallery application which has or have the other state to that of the selected first image.

In some example embodiments, the provided gallery comprises at least one image representing, in a first part of said image, the first user and in a second part of said image, a second user, wherein the at least one criterion is based on a predetermined first user setting associated with the first user and a predetermined second user setting associated with the second user.

In some example embodiments, based on determining that the predetermined first user setting is different from the predetermined second user setting, performing the modification comprises performing the modification for only part of said image.

In some example embodiments, based on determining that the predetermined first user setting is associated with modifying the first part of said image and the predetermined second user setting is associated with not modifying the second part of said image, performing the modification comprises performing the modification without modifying the second part of said image.

In some example embodiments, based on determining that the first and the second parts of said image comprise a same or similar type of object, performing the modification further comprises performing a rotation of the second part of said image so as to substantially align said second part with the modified first part of said image.

In some example embodiments, the type of object is a user's head.

In some example embodiments, the provided user interface is associated with a multi-user video call application in which the plurality of images correspond to respective images or video feeds for a plurality of users, wherein the user interface comprises a first image corresponding to a first user associated with the apparatus and at least one second image corresponding to at least one second user.

In some example embodiments, the at least one criterion is based on identifying a mirrored or non-mirrored state associated with the at least one second image which is opposite to that associated with the first image, and wherein performing the modification comprises modifying the mirrored or non-mirrored state of the first image to the opposite state.

In some example embodiments, the at least one criterion is based on identifying a mirrored or non-mirrored state associated with a predetermined number of second images which is opposite to that associated with the first image, and wherein performing the modification comprises modifying the mirrored or non-mirrored state of the first image to the opposite state.

In some example embodiments, the method further comprises identifying a predefined element in at least one image to be modified from its associated mirrored or non-mirrored state to the opposite state, and based on identifying said predefined element, to determine not to modify at least part of the at least one image which comprises said predefined element.

In some example embodiments, the predefined element comprises a text element in a non-reversed format.

In some example embodiments, the mirrored or non-mirrored state of the at least one image is determined based on metadata associated with the respective image(s).

In some example embodiments, the metadata is indicative of whether the at least one image was captured with a front-facing or rear-facing camera of the apparatus.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer-readable medium comprising program instructions stored thereon for performing at least the following: providing a gallery or user interface comprising a plurality of images; identifying either a mirrored or non-mirrored state associated with at least one of the images; determining, based on at least one criterion, that at least part of the at least one image is to be modified from its associated mirrored or non-mirrored state to the opposite state; and based on the determination, performing the modification.

In a sixth aspect, this specification describes a computer-readable medium (such as a non-transitory computer-readable medium) comprising program instructions stored thereon for performing at least the following: providing a gallery or user interface comprising a plurality of images; identifying either a mirrored or non-mirrored state associated with at least one of the images; determining, based on at least one criterion, that at least part of the at least one image is to be modified from its associated mirrored or non-mirrored state to the opposite state; and based on the determination, performing the modification.

In a seventh aspect, this specification provides an apparatus comprising means for performing: providing a gallery or user interface comprising a plurality of images; identifying either a mirrored or non-mirrored state associated with at least one of the images; determining, based on at least one criterion, that at least part of the at least one image is to be modified from its associated mirrored or non-mirrored state to the opposite state; and based on the determination, performing the modification.

In some example embodiments, performing the modification comprises performing a horizontal flipping of at least part of the at least one image.

In some example embodiments, the at least one criterion is based on a predetermined user setting associated with the gallery or user interface.

In some example embodiments, the provided gallery is associated with a gallery application of the apparatus and is configured to provide a plurality of images associated with a first user or a first user account.

In some example embodiments, the apparatus is configured to receive, via the gallery application of the apparatus, selection of a first image, and wherein the at least one criterion is based on the mirrored or non-mirrored state associated with the selected first image.

In some example embodiments, performing the modification comprises modifying at least part of at least one other image of the gallery application which has or have the other state to that of the selected first image.

In some example embodiments, the provided gallery comprises at least one image representing, in a first part of said image, the first user and in a second part of said image, a second user, wherein the at least one criterion is based on a predetermined first user setting associated with the first user and a predetermined second user setting associated with the second user.

In some example embodiments, based on determining that the predetermined first user setting is different from the predetermined second user setting, performing the modification comprises performing the modification for only part of said image.

In some example embodiments, based on determining that the predetermined first user setting is associated with modifying the first part of said image and the predetermined second user setting is associated with not modifying the second part of said image, performing the modification comprises performing the modification without modifying the second part of said image.

In some example embodiments, based on determining that the first and the second parts of said image comprise a same or similar type of object, performing the modification further comprises performing a rotation of the second part of said image so as to substantially align said second part with the modified first part of said image.

In some example embodiments, the type of object is a user's head.

In some example embodiments, the provided user interface is associated with a multi-user video call application in which the plurality of images correspond to respective images or video feeds for a plurality of users, wherein the user interface comprises a first image corresponding to a first user associated with the apparatus and at least one second image corresponding to at least one second user.

In some example embodiments, the at least one criterion is based on identifying a mirrored or non-mirrored state associated with the at least one second image which is opposite to that associated with the first image, and wherein performing the modification comprises modifying the mirrored or non-mirrored state of the first image to the opposite state.

In some example embodiments, the at least one criterion is based on identifying a mirrored or non-mirrored state associated with a predetermined number of second images which is opposite to that associated with the first image, and wherein performing the modification comprises modifying the mirrored or non-mirrored state of the first image to the opposite state.

In some example embodiments, the apparatus is further configured to identify a predefined element in at least one image to be modified from its associated mirrored or non-mirrored state to the opposite state, and based on identifying said predefined element, to determine not to modify at least part of the at least one image which comprises said predefined element.

In some example embodiments, the predefined element comprises a text element in a non-reversed format.

In some example embodiments, the mirrored or non-mirrored state of the at least one image is determined based on metadata associated with the respective image(s).

In some example embodiments, the metadata is indicative of whether the at least one image was captured with a front-facing or rear-facing camera of the apparatus.

In an eighth aspect, this specification describes an apparatus comprising: a first module configured to provide a gallery or user interface comprising a plurality of images; a second module configured to identify either a mirrored or non-mirrored state associated with at least one of the images; a third module configured to determine, based on at least one criterion, that at least part of the at least one image is to be modified from its associated mirrored or non-mirrored state to the opposite state; and a fourth module configured to perform the modification based on the determination.

BRIEF DESCRIPTION OF DRAWINGS

Example embodiments will now be described, by way of non-limiting example, with reference to the accompanying drawings, in which.

DETAILED DESCRIPTION

Figure 1:
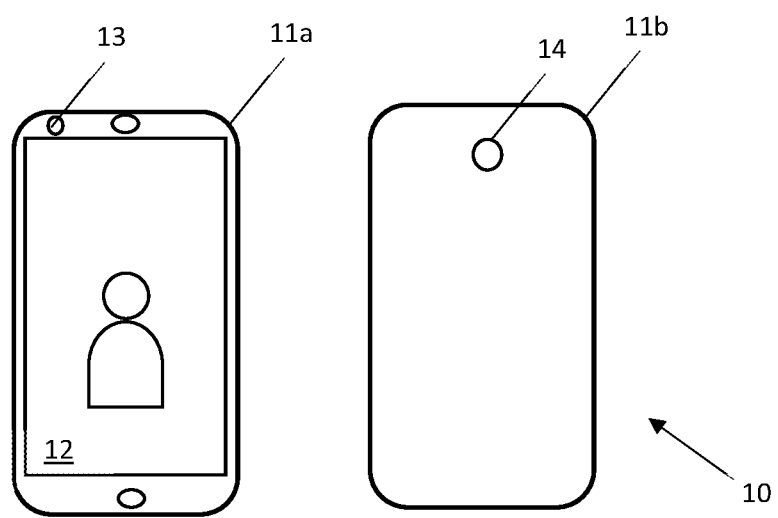
FIG. 1 is a schematic view of a user device.

Example embodiments relate to apparatuses, methods and computer programs for controlling image output, for example image mirroring.

Example embodiments may involve providing a gallery or user interface comprising a plurality of images, for example, on a display of a user device. Either a mirrored or non-mirrored state associated with at least one of the images may be identified. For example, a mirrored state may be indicative of a first capture orientation and a non-mirrored state may be indicative of a second, opposite, capture orientation. Example embodiments may involve determining, based on at least one criterion, whether at least part of the at least one image is to be modified from its associated mirrored or non-mirrored state to the other state, and modifying the at least one image based on the determination.

As described herein, a gallery may comprise a display of a plurality of images stored in a user device or accessible by the user device (e.g. the images may be stored in a remote cloud server and accessed via a data network). For example, the display of the gallery may comprise displaying thumbnail size representations of the plurality of images. Images may be selected from the gallery by a user input (e.g. clicking on an image displayed on a touch-screen display), for example, for displaying the selected image in an enlarged or full size representation (e.g. fitted to the display screen such that the display screen shows only one image at a time). As described herein, images provided in the gallery may comprise still images, video clips, and/or video feeds (e.g. streaming video, such as in video conferencing).

As described herein, a user interface may comprise an application user interface (e.g. showing a plurality of images, such as social media applications) and/or a video conferencing user interface, for example, showing a plurality of images and/or video feeds for a plurality of participants respectively. The application user interface or the video conferencing user interface may be a standalone application or may be provided on a browser. Images provided in the user interface may comprise still images, video clips, and/or video feeds (e.g. streaming video, such as in video conferencing).

As described herein, a mirrored state of an image may be indicative of a first capture orientation. For example, when an image is captured using a front-facing camera (e.g. when a user takes a so-called "selfie"), the display screen (e.g. the viewfinder) may show a mirrored image as the first captured orientation. As such, if the image is saved in the first captured orientation, the image may be saved in a mirrored state on a memory of the device and/or on a cloud server. Alternatively, if the image is saved in a second capture orientation, opposite to the first captured orientation, the image may be saved in a non-mirrored state. In another example, when an image is captured using a rear-facing camera, the display screen is likely to show a non-mirrored image, and the captured orientation may therefore be saved a non-mirrored state of the image.

Example embodiments may provide improvements associated with controlling image mirroring, for example, by providing apparatuses, methods, and systems for controlling the mirrored or non-mirrored state of images associated with user device.

The apparatus may comprise a user device, being a device operable by one or more users and configured to provide a gallery or user interface. The term "user device" will be used hereafter.

A user device may comprise processing functionality for executing one or more applications, for example (but not limited to) one or more of a web browser application, an image capturing application, an image viewing application (e.g. a gallery application), a video conference application, a video playing application, and a music playing application.

A user device may also comprise one or more input modules and one or more output modules. For example, a user device may comprise one or more input transducers and one or more output transducers. For example, the one or more input transducers may comprise one or more microphones for converting sound waves to electrical signals which may be stored, processed and transmitted as audio data. For example, the one or more output transducers may comprise one or more loudspeakers for converting electrical signals into sound waves.

As described herein, a user device may have a display, a front-facing camera, and a rear-facing camera. For example, the user device may also comprise one or more cameras for capturing still images and/or video images which can be stored, processed and transmitted as image or video data. For example, a user device may comprise one or more displays, which may comprise any form of electronic display which may or may not be a touch-sensitive display. In the case of a touch-sensitive display, the display may also provide a form of input module, for example to receive and invoke selection commands based on detecting a touch input, for example corresponding to a particular user interface element being displayed by the touch-sensitive display.

The user device may also comprise one or more other input modules, such as one or more of an accelerometer and gyroscope (inertial sensors) for generating motion data from which can be determined motion characteristics of the user device. The user device may also comprise one or more positioning receivers, such as a Global Navigation Satellite System (GNSS) receiver, for determining the geographic position of the user device. Other positioning systems or methods may be used.

The user device may comprise, but is not limited to, a smartphone, a digital assistant, a digital music player, a personal computer, a laptop, a tablet computer or a wearable device such as a smartwatch. The user device may be capable of establishing a communication session with one or more other user devices via a communications network.

The user device may be configured to transmit and receive data using protocols for 3G, 4G, LTE, 5G or any future generation communication protocol. The user device may be configured to communicate over local or wide area networks using, e.g. WiFi. The user device may comprise means for short-range communications using, for example, Bluetooth, Zigbee or WiFi. The user device may comprise one or more antennas for communicating with external devices.

Referring to FIG. 1, an example user device 10 is shown in the form of a smartphone.

The user device 10 is shown in a front view 11a and a back view 11b. The user device 10 may comprise a display 12, such as a touch-sensitive display (hereafter "display"), a front-facing camera 13, and a rear-facing camera 14. The user device 10 may further comprise a microphone, and an audio output means (e.g. a loudspeaker). The front-facing camera 13 or the rear-facing camera 14 may be enabled, for example, during capturing an image or video, or during a video call or videoconference whereby image and/or video data captured by the front-facing camera may be transmitted over the video call or videoconference session.

In some user devices, such as the user device 10 shown in FIG. 1, when the front-facing camera 13 is used for capturing an image or video, the view-finder on the display 12 may show a mirrored image, which may or may not be different from the image as saved. The captured image or video may therefore be saved in a mirrored state or a non-mirrored state. For example, a user may have a predefined setting or preference (e.g. a default setting) for saving images in a mirrored state or non-mirrored state. The display on the view-finder and/or saved image may use this predefined setting when images are captured or saved respectively. Alternatively, or in addition, when a user sees an image in a first orientation (e.g. a mirrored image) on the display 12, they may have a preference to either save it in the same orientation or save it in an opposite orientation (e.g. as a non-mirrored image). Example embodiments described below provide techniques for achieving consistency or a preferred (e.g. user preferred) way of controlling mirroring of images for output and/or storage.

Figure 2:
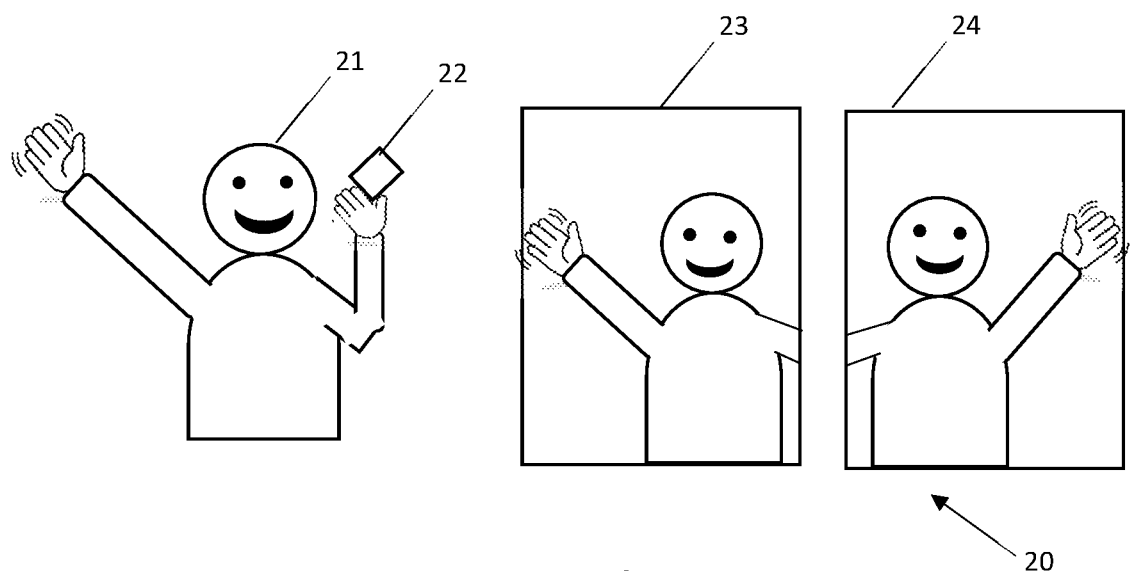
FIG. 2 is a schematic view of an example scenario.

Referring to FIG. 2, an example scenario 20 is shown. A user 21 may capture an image of himself using a front-facing camera (not shown) of a user device 22 (similar to the user device 10). The captured image in a non-mirrored state is shown by a first image 23, and the captured image in a mirrored state is shown by a second image 24. For example, the second image 24 may be output to the user 21 on the screen of the user device 22 while capturing the image. However, the first image 23 may be considered a more usual representation of the user 21 (e.g. left hand waving). The second image 24 may be a horizontally flipped version of the first image 23.

Figure 3:
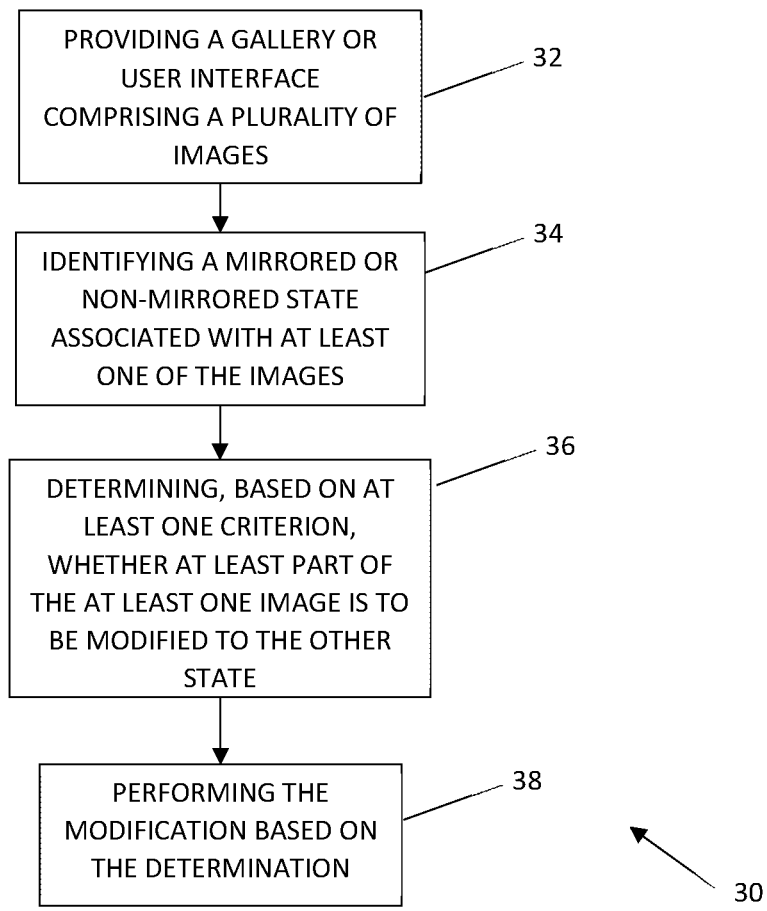
FIG. 3 is a flowchart of an algorithm in accordance with an example embodiment.

FIG. 3 is a flowchart of an algorithm, indicated generally by the reference numeral 30, in accordance with an example embodiment. FIG. 3 may be viewed in conjunction with FIG. 1, and may refer to the reference numerals of FIG. 1.

An operation 32 may comprise providing a gallery or user interface comprising a plurality of images. For example, the gallery or user interface may be provided on a display 12 of the user device 10, to be viewable by a user of the user device 10. In one example, the at least one of the plurality of images may be captured with the front-facing camera 13 or the rear-facing camera 14 of the user device 10. In another example, the image may be stored in the user device 10 or may be accessible via an application (e.g. web browser, social media application, video call or video conferencing application) or at a cloud server.

An operation 34 may comprise identifying either a mirrored state or a non-mirrored state associated with at least one of the images. As described above, the mirrored state may be indicative of a first capture orientation, and the non-mirrored state may be indicative of a second, opposite, capture orientation. In one example, the mirrored or non-mirrored state of the at least one image is determined based on metadata associated with the respective image(s). For example, the metadata may be indicative of whether the at least one image was captured with the front-facing camera 13 or the rear-facing camera 14 of the user device 10. Images captured with the front-facing camera 13 may be determined to be associated with a mirrored state, while images captured with the rear-facing camera 14 may be determined to be associated with a non-mirrored state. In another example, the mirrored or non-mirrored state of the at least one image may be determined based on image analysis and/or comparison with other images whose associated mirrored or non-mirrored state is known (e.g. an SLR image).

An operation 36 may comprise determining, based on at least one criterion, whether at least part of the at least one image is to be modified from its associated mirrored or non-mirrored state to the other state. The at least one criterion is or are described in further detail below.

At operation 38, a modification may be performed based on the determination of operation 36. For example, when it is determined that at least one image is to be modified, the modification is performed on the at least one image. Alternatively, when it is determined that at least one image is not to be modified, then a modification is not performed on the at least one image, but may be performed on one or more other images.

In an example embodiment, performing the modification comprises performing a horizontal flipping of at least part of the at least one image, such that the image, or part of the image, is modified from its associated mirrored or non-mirrored state to the other state.

Figure 4:
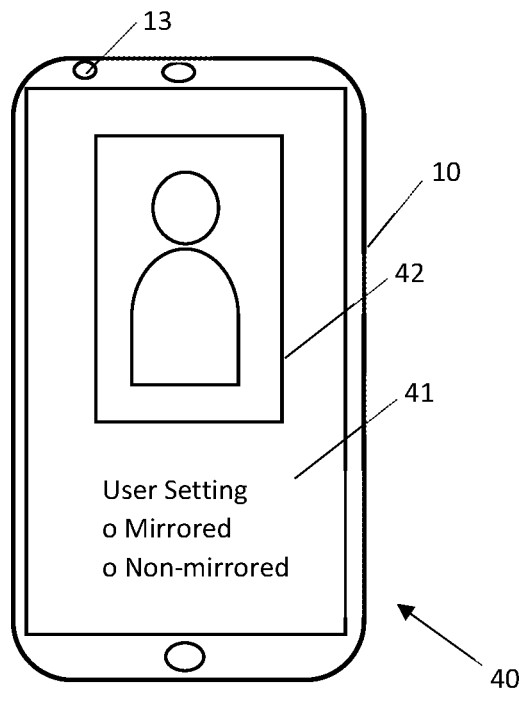
FIG. 4 shows a schematic view of a system in accordance with another example embodiment.

FIG. 4 shows a system, indicated generally by the reference numeral 40, in accordance with an example embodiment. System 40 comprises the user device 10 described above with reference to FIG. 1. In an example embodiment, the at least one criterion for determining whether to modify an image is based on a predetermined user setting associated with the gallery or user interface. For example, a user input means 41 may be provided at the user device 10 for at least one image 42. A user may input a predetermined user setting by selecting either a mirrored state or a non-mirrored mirrored state on the user input means 41. The predetermined user setting may then be applied to at least one image 42 or possibly to a set of multiple images, e.g. all images associated with the gallery or all images within a particular folder associated with the gallery. For example, if an image 42 is in a mirrored state, and the predetermined user setting indicates a non-mirrored state, then the image 42 is modified from its associated and current mirrored state to the non-mirrored state; if the image 42 is in a non-mirrored state, and the predetermined user setting indicates a mirrored state, then the image 42 is modified from its associated and current non-mirrored state to the mirrored state. If the image 42 is already in a state indicated by the predetermined user setting, then the image 42 may not be modified.

It will be appreciated that the user input means 41 may be, but is not limited to, one or more graphical user interface elements through which selection can be achieved via a touch screen interface or cursor, a voice input means, a wireless input means (e.g. via a Bluetooth connection), or the like.

In an example embodiment, the gallery or user interface may comprise a plurality of images from various sources and/or devices, including images captured using the front-facing camera 13 and/or the rear-facing camera 14. When the user inputs the predetermined user setting using the user input means, one or more images in the gallery or user interface may be displayed based on the predetermined user setting. For example, if the predetermined user setting indicates a mirrored state, the one or more images in the gallery or user interface are displayed and/or stored in a mirrored state. In one example, the one or more images comprise the images that are associated with the user and/or a user account (e.g. a social media account of the user). For example, one or more images captured by the user and/or one or more images where the user is present (e.g. tagged in the one or more images) may be displayed in a mirrored state in a consistent manner.

In one example embodiment, the user input means 41 may be provided in relation to a single image, some of the plurality of images (e.g. displayed using thumbnails), or all of the plurality of images in the gallery or user interface. Alternatively, or in addition, the user input means 41 may be provided in relation to a user interface of an application (e.g. a web browser, a social media application, a video call application, or the like). For example, a user may indicate, via the user input means 41, a predefined user setting that they prefer to apply a mirrored state to images (for front-facing captured images) to be uploaded to a particular social media application.

Figure 5:
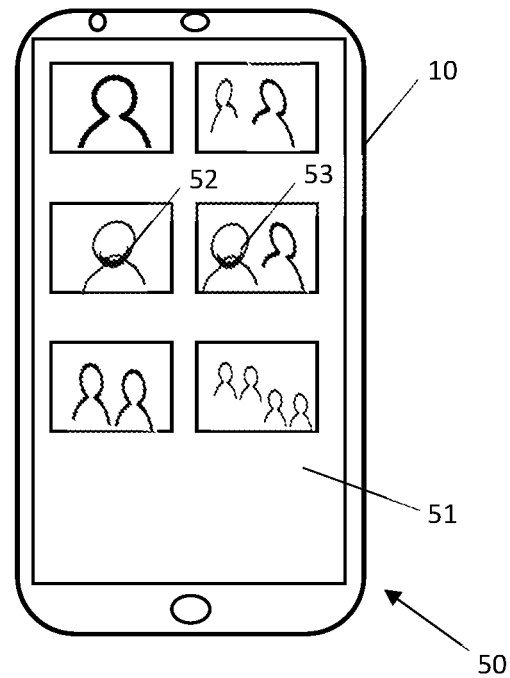
FIG. 5 shows a schematic view of a system in accordance with another example embodiment.

FIG. 5 shows a system, indicated generally by the reference numeral 50, in accordance with another example embodiment.

System 50 may comprise the user device 10 described above with reference to FIG. 1. A gallery 51 may be provided (e.g. in accordance with operation 32) for output on the display 12 of the user device 10, wherein the gallery 51 comprises a plurality of images. The provided gallery 51 may be associated with a gallery application of the user device 10, and may be configured to output a plurality of images associated with a first user or a first user account. For example, first and second images 52, 53 may be associated with the first user (shown to have a beard) by way of the first user being present in the first and second images, determined by, for example, image recognition software and/or metadata tags associated with the first and second images. Alternatively, or additionally, the first and second images 52, 53 may be associated with the first user by way of the first user having captured the first and second images. Alternatively, or additionally, the first and second images 52, 53 and other images in the gallery 51 may be associated with the first user by way of being stored in a device (the user device 10) used by the first user or may be associated with a first user account by way of being available or accessible in an application (e.g. web browser, social media application, video call or conference application, cloud storage application) associated with a first user account that belongs to the first user.

Figure 6:
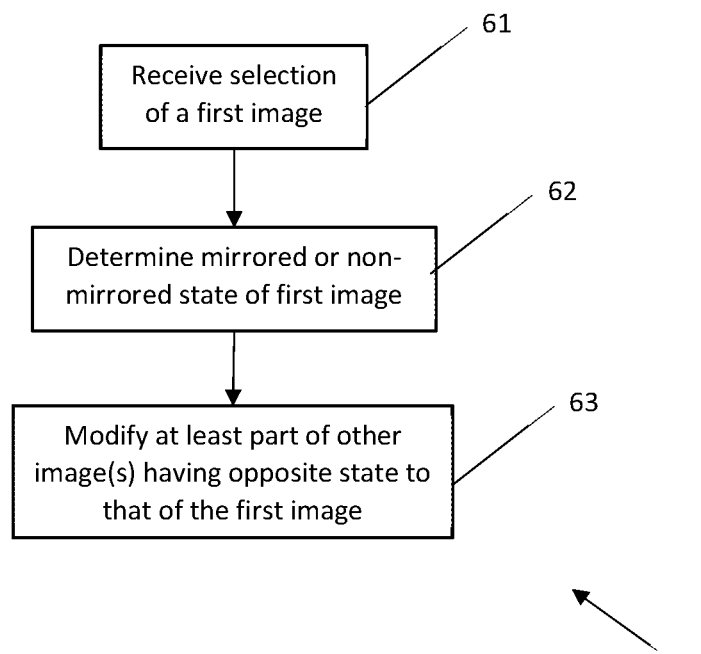
FIG. 6 is a flowchart of an algorithm in accordance with another example embodiment.
Figure 7:
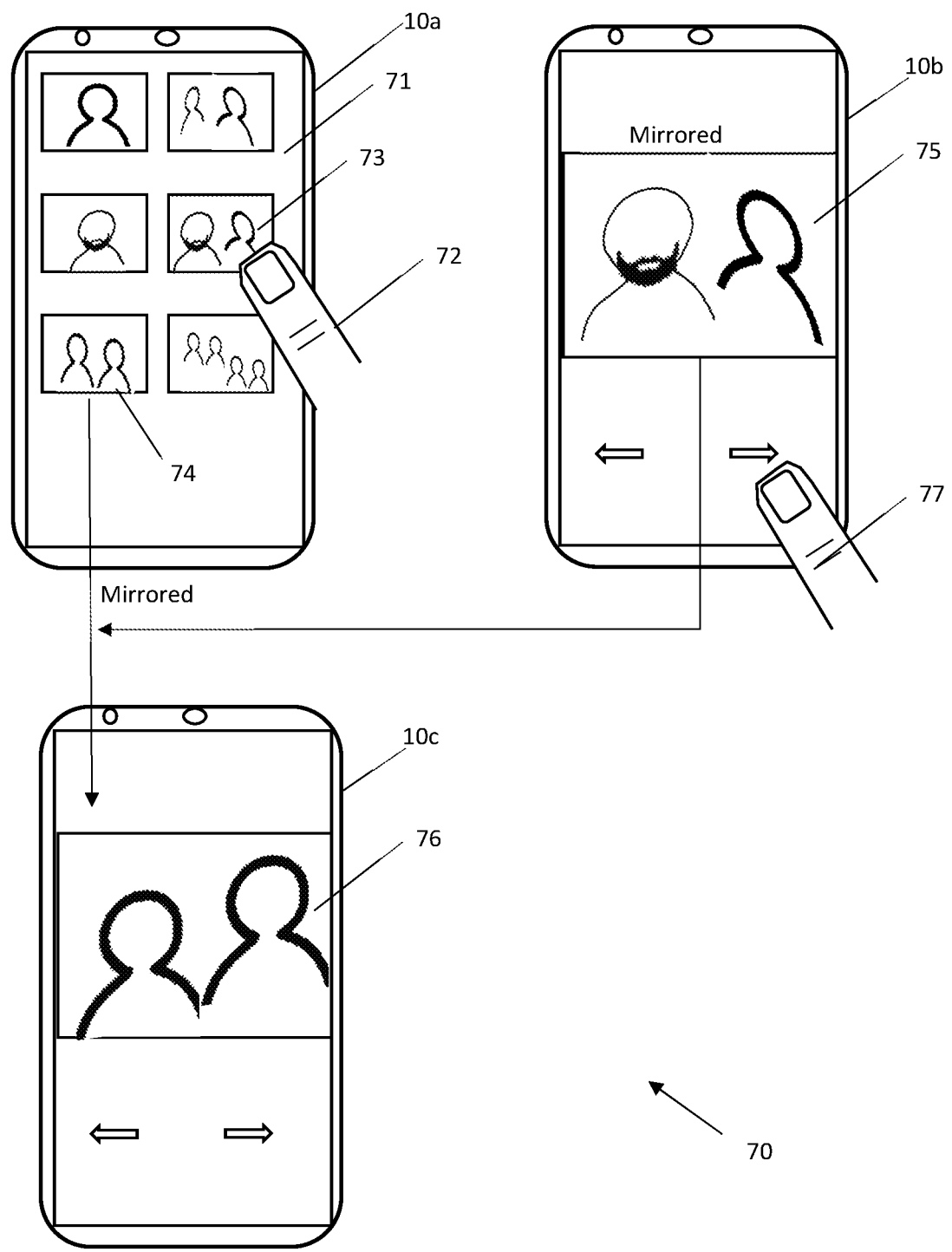
FIG. 7 shows a schematic view of a system in accordance with another example embodiment.

FIG. 6 is a flowchart of an algorithm, indicated generally by the reference numeral 60, in accordance with another example embodiment. FIG. 7 shows a system, indicated generally by the reference numeral 70, which may be viewed in conjunction with FIG. 6 for clear understanding.

Referring to FIG. 6, an operation 61 may comprising receiving selection of a first image. Another operation 62 may comprise determining a mirrored or non-mirrored state of the first image. Another operation 63 may comprise modifying at least part of at least one other image(s) having the opposite state to that of the first image.

Referring now to FIG. 7, the system 70 shows the user device 10, shown in three respective stages 10a, 10b, and 10c.

The user device 10 in a first stage 10a may provide a gallery 71 comprising a plurality of images, including first and second images 73, 74. The gallery 71 may be provided via a gallery application of the user device 10. A user input 72 (e.g. a touch input received on a touch screen display) may be used by a user for performing one or more tasks on the gallery application. The gallery 71 may provide thumbnail views of the plurality of images, including the first and second images 73, 74.

With regard to operation 61 of FIG. 6, selection of the first image 73 may be received via the gallery 71. The at least one criterion for determining whether or not at least one image is to be modified (e.g. as described with reference to operation 36 in FIG. 3) may be based on the identified mirrored or non-mirrored state associated with the selected first image 73.

Referring to FIG. 7, as shown in a second stage 10b, selection of the first image 73 may allow the first image 73 to be displayed as an enlarged or full size version 75 of the first image 73.

With regard to operation 62 of FIG. 6, a mirrored or non-mirrored state of the selected first image 73 may be determined (e.g. using metadata of the selected first image). For example, it may be determined that the selected first image 73 is associated with a mirrored state.

With regard to operation 63 of FIG. 6, at least part of at least one other image of the gallery application which has or have the other state to that of the selected first image may be modified. For example, in the event that the selected first image 73 is determined to be in a mirrored state, any images in the gallery 71 that are identified to be in a non-mirrored state may be modified to have the opposite, mirrored, state. For example, the second image 74, originally having a non-mirrored state, may be modified to have a mirrored state, as shown by the enlarged or full size version 76 of the second image (e.g. a horizontally flipped version of the second image 74) in a third stage 10c.

In some embodiments, for example, when the user is viewing the enlarged or full size version 75 of the first image 73, a further user input 77 may be used for navigating (e.g. by swiping, clicking, etc.) to a next image, which next image may comprise the second image 74. As the second image 74 had been modified in the above operation 63 to be have a mirrored state, when the further user input 77 is received, the enlarged or full-size version 76 of the second image may be displayed having the opposite state.

In accordance with the above example embodiment, when a user opens the gallery 71 and selects (e.g. by clicking) an image, the selected image being associated with a mirrored state, the user may navigate back and forth to display at least some of the other images in a similar way i.e. in a mirrored state. Alternatively, if the first selected image is associated with a non-mirrored state, at least some of the other images that were originally in a mirrored state may be modified to be in a non-mirrored state to match the state of the first selected image. The modified images may be temporarily displayed in the modified state, and/or may be both displayed and saved in the modified state.

In one example, the plurality of images may be a part of an image slideshow and/or video compilation (e.g. series of images and/or videos). As such, a mirrored or non-mirrored state associated with a first selected image (or video) may be applied to the rest of the images and/or videos, such that images and/or videos associated with an opposite state may be modified to the state of the first selected image, thus improving consistency. In an example, the image/video slideshow/compilation may be related to collaborative content, where image(s) and/or video(s) may be contributed from various sources. As such, newly-added content that is not already associated with the mirrored or non-mirrored state associated with the first selected image may be modified to be associated with the state of the first selected image.

Figure 8:
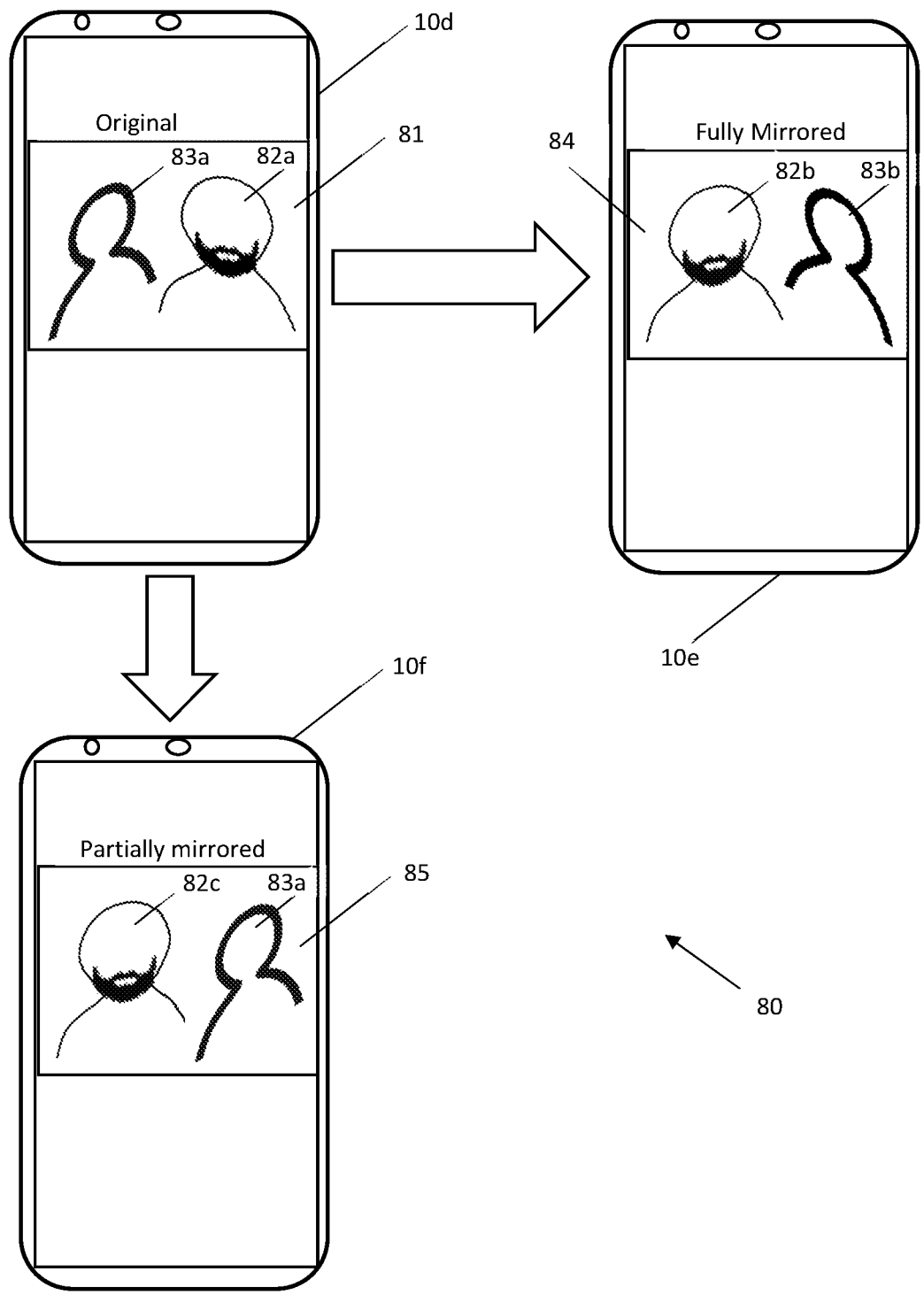
FIG. 8 shows a schematic view of a system in accordance with another example embodiment.

FIG. 8 shows a system, indicated generally by the reference numeral 80, in accordance with another example embodiment. System 80 shows the user device 10 in three respective stages 10d, 10e, and 10f.

In a first stage 10d, a first image 81 is shown, which first image 81 may be opened from a gallery.

The first image 81 may comprise one or more parts or portions, comprising a subset of pixels of the overall image. The first image 81 may for example represent a first user in a first part 82a of the first image, and may also represent a second user in a second part 83a of the first image.

The first image 81 may be associated with a non-mirrored state.

The second stage 10e shows a modified version 84 of the first image 81, the modified version being associated with a mirrored state. As such, the first part 82b is a mirrored version of the first part 82a, and the second part 83b is a mirrored version of the second part 83a. The modified version 84 of the first image 81 may be termed a fully mirrored version.

In some example embodiments, different portions of a particular image, e.g. the first image 81 may have different settings associated with mirrored and non-mirrored states. For example, the at least one criterion for determining whether or not at least one image is to be modified (e.g. as described with reference to operation 36 in FIG. 3) may be based on a predetermined first user setting associated with the first user and a predetermined second user setting associated with the second user.

For example, if it is determined that the predetermined first user setting is different from the predetermined second user setting, modification of the first image 81 may comprise performing modification of only part of the first image (e.g. rather than the full image).

For example, if it is determined that the predetermined first user setting is associated with modifying the first part 82a of the first image 81 and the predetermined second user setting is associated with not modifying the second part 83a of the first image, the modification may be performed without modifying the second part 83*a* of the first image. Other parts of the first image 81 (e.g. all pixels of the first image other than the second part 83*a*) may be modified.

For example, the predetermined first user setting may indicate a mirrored state, while the predetermined second user setting may indicate a non-mirrored state.

As shown in a third stage 10*f*, the first image 81 may be partially modified into a modified version 85 of the first image. This may be termed a partially mirrored version. The modified version 85 of the first image 81 may be such that the second part 83*a* is not modified, and the other parts of the first image, including the first part 82*a*, may be modified to have a mirrored orientation.

In some example embodiments, multiple users, such as the first and second users referred to above, may have a preference for mirroring their images generally, or only when their images are shared to a social media service. This preference may be taken into account when viewing and/or when sharing images. Parts of the image associated with one or more users visible in the image may be mirrored or non-mirrored according to the respective user's preferences (e.g. their predetermined settings). A part or whole of the images of each user may be mirrored. In one example, where mirroring of a part of an image associated with a specific user is not possible, the image may be displayed in cropped parts, such that parts associated with separate users are displayed separately having mirrored or non-mirrored states based on respective preferences of the users.

In some example embodiments, if it is determined that the first and the second parts of an image comprise a same or similar type of object (e.g. a body, a head, etc. of the first user and the second user) a rotation of the second part of said image may be performed so as to substantially align said second part with the modified first part of said image. For example, in the modified version 85 of the first image 81, because all parts of the image except the second part 83*a* are associated with a mirrored state, a rotation of at least part of the second part 83*a* may be performed. For example, the second part 83*a* may comprise a user's head, such that the user's head may be rotated in order to substantially align the second part 83*a* with the modified (e.g. mirrored) first part 82*c*.

Figure 9:
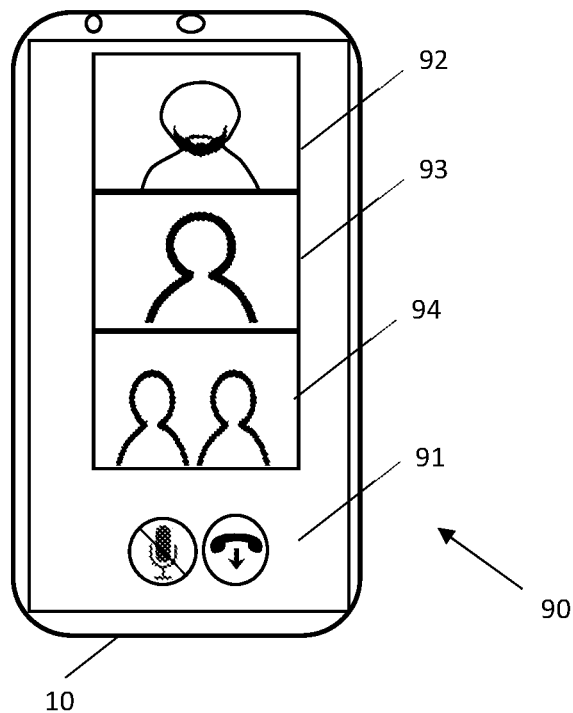
FIG. 9 shows a schematic view of a system in accordance with another example embodiment.

FIG. 9 is a system, indicated generally by the reference numeral 90, in accordance with another example embodiment.

System 90 shows the user device 10 described above with reference to FIG. 1.

The user device 10 may provide a user interface 91 that is associated with a multi-user video call application. In the multi-user video call application, a plurality of images in the user interface 91 may correspond to respective images or video feeds for a plurality of users. For example, the user interface 91 may comprise a first image 92 that corresponds to a first user associated with the user device 10, a second image 93 corresponding to a second user and a third image 94 corresponding to one or more third users.

Figure 10:
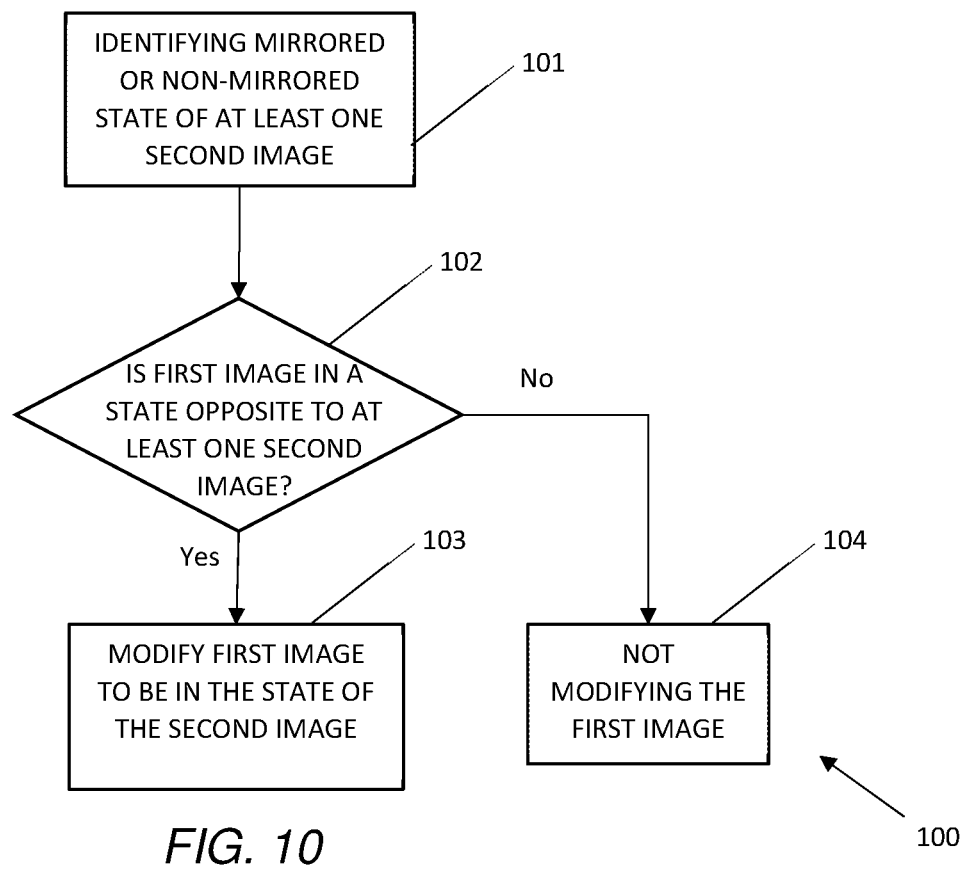
FIG. 10 is a flowchart of an algorithm in accordance with an example embodiment.

FIG. 10 is a flowchart of an algorithm, indicated generally by the reference numeral 100, in accordance with an example embodiment.

At operation 101, a mirrored or non-mirrored state of at least one second image (for example of the second and third images 93, 94) is identified.

At operation 102, it is determined if a first image (92) is associated with a mirrored or non-mirrored state opposite to that of the at least one second image. If so, the first image is modified, at operation 103, to the state associated with the at least one second image. Alternatively, if the state of the first image is not opposite to that of the at least one second image, the first image is not modified (operation 104).

In an example embodiment, the at least one criterion for determining whether or not at least one image is to be modified (e.g. as described in operation 36) may be based on identifying, at operation 101, a mirrored or non-mirrored state associated with the at least one second image which is determined, at operation 102, to be opposite to that associated with the first image. Based on the determination, the mirrored or non-mirrored state of the first image may be modified to the opposite state, so as to be associated with a state similar to the at least one second image.

For example, if the first image 92 is associated to a non-mirrored state, and at least one of the images 93 and 94 are in a mirrored state, the first image may be modified to be in a mirrored state.

In an example embodiment, the first image 92 is modified only if a predetermined number of second images 93 and 94 are determined to be in state that is opposite to that associated with the first image. The at least one criterion for determining whether or not at least one image is to be modified (e.g. as described in operation 36) may be based on identifying a mirrored or non-mirrored state associated with a predetermined number of second images which is opposite to that associated with the first image. Performing the modification comprises modifying the mirrored or non-mirrored state of the first image to the opposite state. For example, the first image 92 may be modified to be associated with a mirrored state if both the images 93 and 94 are associated with a mirrored state, but the first image 92 may not be modified to be associated with a mirrored state if only one of the images 93 and 94 are associated with a mirrored state.

In an example embodiment, instead of or in addition to modification based on mirrored or non-mirrored state of at least one second image, the first image may be modified in order to match a scene and/or virtual seating arrangement in a video call.

Figure 11:
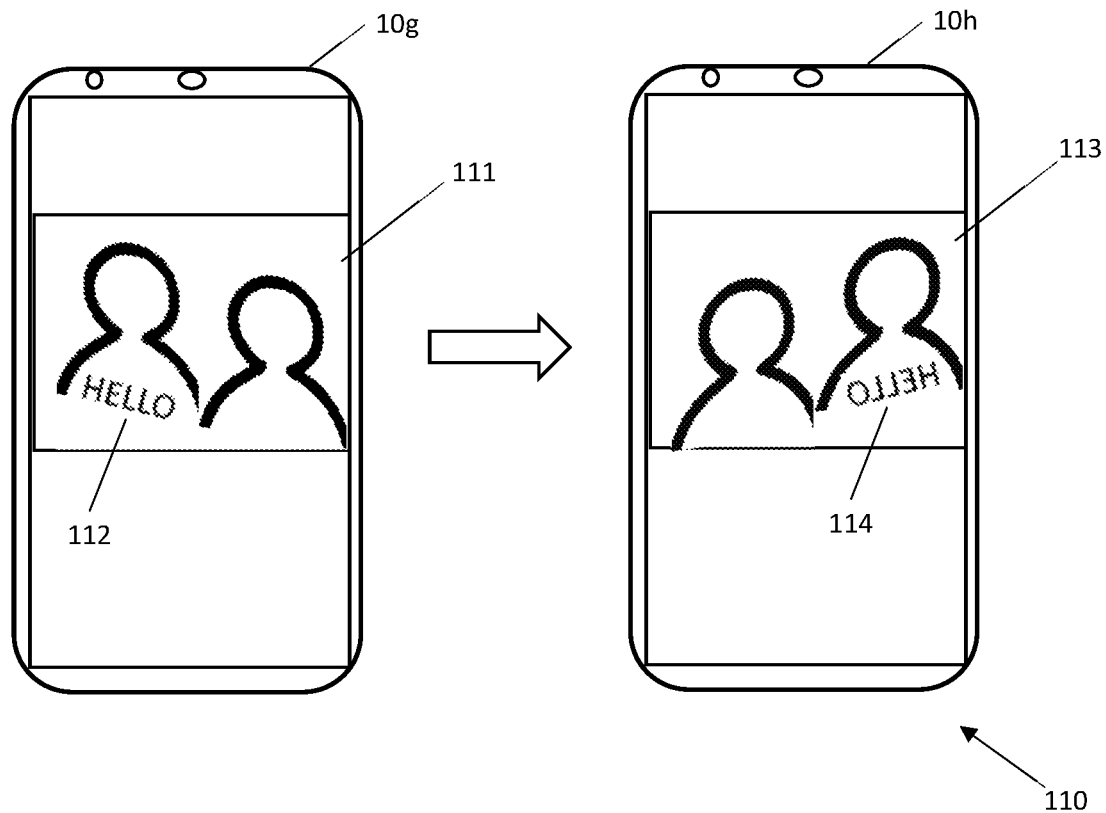
FIG. 11 shows a schematic view of a system in accordance with another example embodiment.

FIG. 11 is a system, indicated generally by the reference numeral 110, in accordance with an example embodiment. System 110 shows the user device (such as the user device 10 described above with reference to FIG. 1) in stages 10*g* and 10*h*. The user device shows, in stage 10*g*, a first image 111 associated with a non-mirrored state. The first image 111 comprises a predefined element, such as the text element 112. If the first image 111 is modified to the second image 113 (shown in stage 10*h*) associated with a mirrored state, the text element 112 will be modified to the text element 114 associated with a mirrored state. It may be desirable to display text in a non-mirrored state, as the text in a mirrored state may not be easily legible, and the mirroring of the image may be easily recognized, and may not look accurate.

Figure 12:
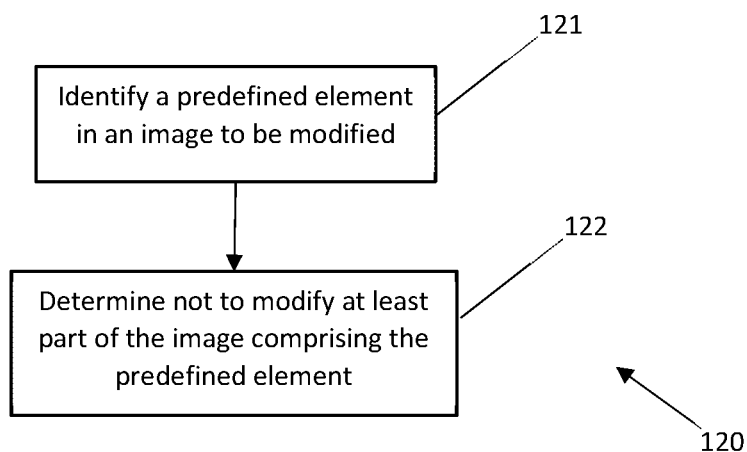
FIG. 12 is a flowchart of an algorithm in accordance with an example embodiment.

FIG. 12 is a flowchart of an algorithm, indicated generally by the reference numeral 120, in accordance with an example embodiment. Operation 121 comprises identifying a predefined element in at least one image to be modified from its associated mirrored or non-mirrored state to the opposite state. If the predefined element is identified, at operation 122, it is determined not to modify at least part of the at least one image which comprises said predefined element. In one example, the predefined element comprises a text element in a non-reversed format. It will be appreciated that the predefined element may also comprise other elements that may be desirable to not be modified to the opposite state.

For example, with reference to FIG. 11, the text element 112 may be identified at operation 121, such that in operation 122, it is determined not to modify the image 111 (e.g. even when image 111 would have otherwise been modified based on other criterion described above). Alternatively, at operation 122, it may be determined to not modify a part of the image 111 comprising the text element 112, while at least some other parts of the image 111 may be modified. Such an image may be similar to the image 113, with the exception of the text element 114 such that the text element 114 is not shown in a reversed format.

In one example, the predefined element may be defined based on one or more of the size of the text, overlap of the predefined element (e.g. text) with other parts of the image, or the like. For example, the predefined element may be defined as a text element with a threshold size, such that if any text element is larger than the threshold size and is in a non-reversed format, then the image is not modified to be in a mirrored state. If any text element is smaller than the threshold size or is already in a reversed format, the image may be modified to be in a mirrored state. Alternatively, or in addition, the image may be modified further by blurring any text element.

Figure 13:
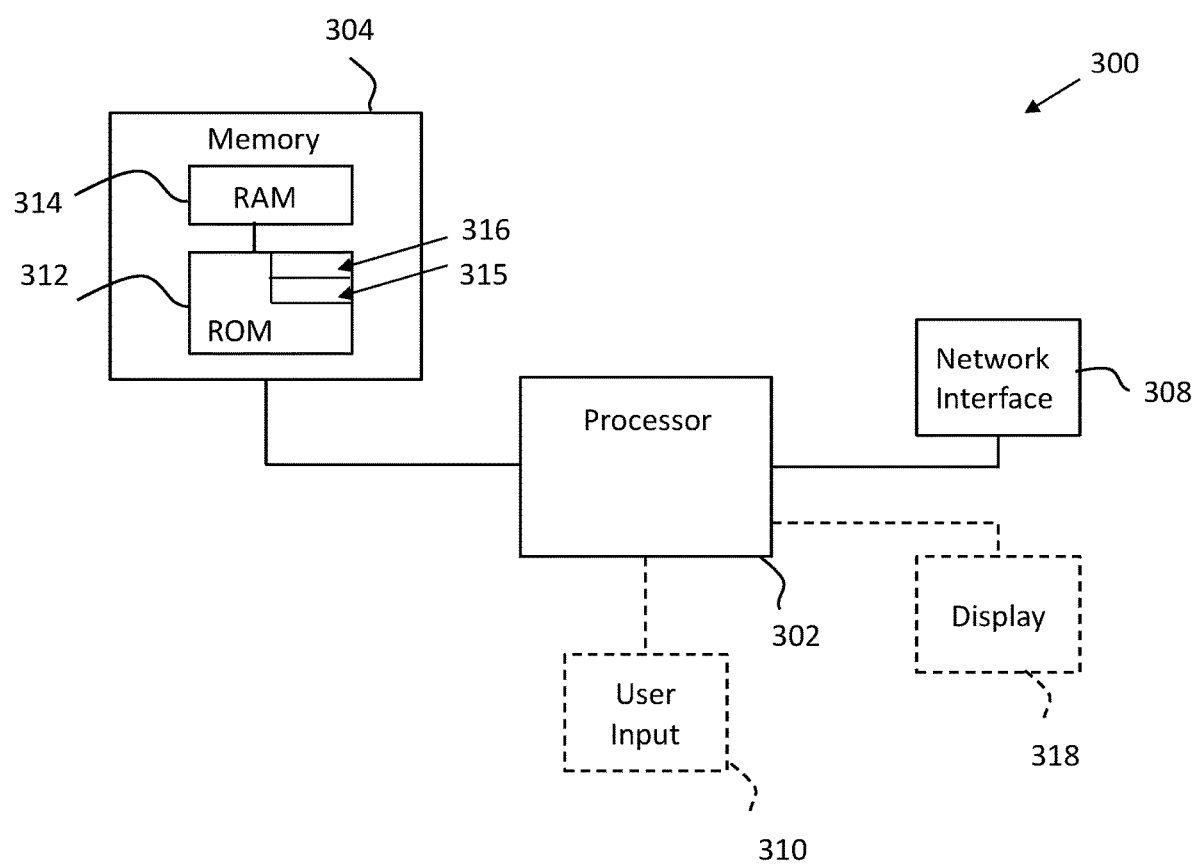
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be the user device 10 referred to above. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 60, 100, and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
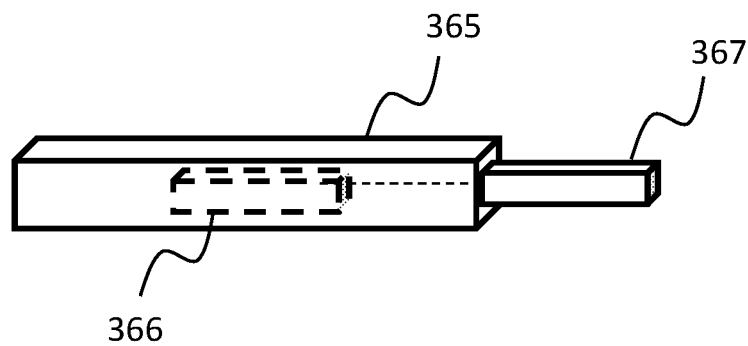
FIGS. 14A and 14B show tangible media, respectively a removable non-volatile memory unit and a Compact Disc (CD) storing computer-readable code which when run by a computer perform operations according to example embodiments.
Figure 14B:
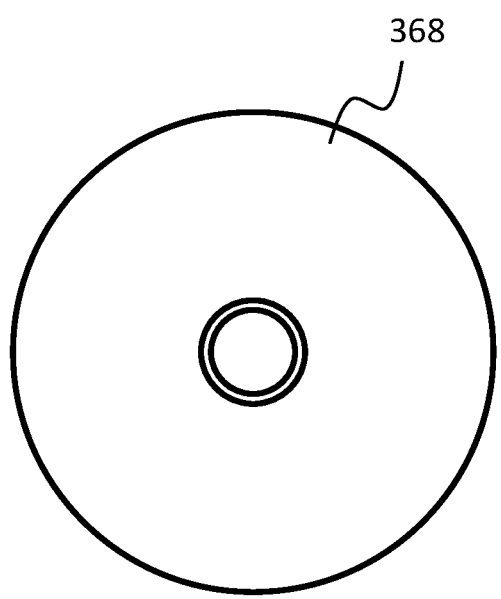

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3, 6, 10, and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising
at least one processor; and
at least one memory including computer program code;
the at least one memory and the computer program code configured to, with the at least one processor, cause the apparatus at least to perform:
providing a gallery or user interface comprising a plurality of images;
identifying either a mirrored or non-mirrored state associated with at least one of the images;
determining, based on at least one criterion, whether at least part of the at least one image is to be modified from its associated mirrored or non-mirrored state to the other state; and
based on the determination, performing the modification.

2. An apparatus as claimed in claim 1, wherein performing the modification comprises performing a horizontal flipping of at least part of the at least one image.

3. An apparatus as claimed in claim 1, wherein the at least one criterion is based on a predetermined user setting associated with the gallery or user interface.

4. An apparatus as claimed in claim 1, wherein the provided gallery is associated with a gallery application of the apparatus and is configured to provide a plurality of images associated with a first user or a first user account.

5. An apparatus as claimed in claim 4, wherein the apparatus is configured to receive, via the gallery application of the apparatus, selection of a first image, and wherein the at least one criterion is based on the mirrored or non-mirrored state associated with the selected first image.

6. An apparatus as claimed in claim 5, wherein performing the modification comprises modifying at least part of at least one other image of the gallery application which has or have the other state to that of the selected first image.

7. An apparatus as claimed in claim 4, wherein the provided gallery comprises at least one image representing, in a first part of said image, the first user and in a second part of said image, a second user, wherein the at least one criterion is based on a predetermined first user setting associated with the first user and a predetermined second user setting associated with the second user.

8. An apparatus as claimed in claim 7, wherein, based on determining that the predetermined first user setting is different from the predetermined second user setting, performing the modification comprises performing the modification for only part of said image.

9. An apparatus as claimed in claim 8, wherein, based on determining that the predetermined first user setting is associated with modifying the first part of said image and the predetermined second user setting is associated with not modifying the second part of said image, performing the modification comprises performing the modification without modifying the second part of said image.

10. An apparatus as claimed in claim 9, wherein, based on determining that the first and the second parts of said image comprise a same or similar type of object, performing the modification further comprises performing a rotation of the second part of said image so as to substantially align said second part with the modified first part of said image.

11. An apparatus as claimed in claim 10, wherein the type of object is a user's head.

12. An apparatus as claimed in claim 1, wherein the provided user interface is associated with a multi-user video call application in which the plurality of images correspond to respective images or video feeds for a plurality of users, wherein the user interface comprises a first image corresponding to a first user associated with the apparatus and at least one second image corresponding to at least one second user.

13. An apparatus as claimed in claim 12, wherein the at least one criterion is based on identifying a mirrored or non-mirrored state associated with the at least one second image which is opposite to that associated with the first image, and wherein performing the modification comprises modifying the mirrored or non-mirrored state of the first image to the opposite state.

14. An apparatus as claimed in claim 12, wherein the at least one criterion is based on identifying a mirrored or non-mirrored state associated with a predetermined number of second images which is opposite to that associated with the first image, and wherein performing the modification comprises modifying the mirrored or non-mirrored state of the first image to the opposite state.

15. An apparatus as claimed in claim 1, wherein the apparatus is further configured to identify a predefined element in at least one image to be modified from its associated mirrored or non-mirrored state to the opposite state, and based on identifying said predefined element, to determine not to modify at least part of the at least one image which comprises said predefined element.

16. An apparatus as claimed in claim 15, wherein the predefined element comprises a text element in a non-reversed format.

17. An apparatus as claimed in claim 1, wherein the mirrored or non-mirrored state of the at least one image is determined based on metadata associated with the respective image(s).

18. An apparatus as claimed in claim 17, wherein the metadata is indicative of whether the at least one image was captured with a front-facing or rear-facing camera of the apparatus.

19. A computer-implemented method, comprising:
providing a gallery or user interface comprising a plurality of images;
identifying either a mirrored or non-mirrored state associated with at least one of the images;
determining, based on at least one criterion, that at least part of the at least one image is to be modified from its associated mirrored or non-mirrored state to the opposite state; and
based on the determination, performing the modification.

20. A non-transitory computer readable medium comprising program instructions stored thereon for performing at least the following:
providing a gallery or user interface comprising a plurality of images;
identifying either a mirrored or non-mirrored state associated with at least one of the images;

determining, based on at least one criterion, that at least part of the at least one image is to be modified from its associated mirrored or non-mirrored state to the opposite state; and based on the determination, performing the modification.

* * * * *